(12) United States Patent
Zhuravlev

(10) Patent No.: US 8,061,229 B2
(45) Date of Patent: Nov. 22, 2011

(54) GEAR DRIVE

(75) Inventor: German Alexandrovich Zhuravlev, Rostov-na-Donu (RU)

(73) Assignee: Roman Vasilyevich Novikov, Moscow (RU)

( * ) Notice: Subject to any disclaimer, the term of this patent is extended or adjusted under 35 U.S.C. 154(b) by 788 days.

(21) Appl. No.: 11/922,944

(22) PCT Filed: Jul. 5, 2005

(86) PCT No.: PCT/RU2005/000367
§ 371 (c)(1),
(2), (4) Date: Dec. 27, 2007

(87) PCT Pub. No.: WO2007/008096
PCT Pub. Date: Jan. 18, 2007

(65) Prior Publication Data
US 2009/0165585 A1    Jul. 2, 2009

(51) Int. Cl.
*F16H 55/00* (2006.01)
*F16H 55/08* (2006.01)
(52) U.S. Cl. .......................... 74/457; 74/462
(58) Field of Classification Search .............. 74/440, 74/445, 457, 459.5, 460, 462
See application file for complete search history.

(56) References Cited

U.S. PATENT DOCUMENTS

| | | | | |
|---|---|---|---|---|
| 3,269,205 A | * | 8/1966 | Niemann | 74/458 |
| 3,918,315 A | * | 11/1975 | Rouverol | 74/462 |
| 4,589,300 A | * | 5/1986 | Rouverol | 74/462 |
| 4,644,814 A | * | 2/1987 | Rouverol | 74/462 |
| 5,135,373 A | * | 8/1992 | Cozens | 418/190 |
| 5,181,433 A | * | 1/1993 | Ueno et al. | 74/409 |
| 5,490,433 A | * | 2/1996 | Althen | 74/348 |
| 5,580,327 A | * | 12/1996 | Deriaz | 475/344 |
| 6,837,123 B2 | | 1/2005 | Hawkins | |
| 2002/0134184 A1 | | 9/2002 | Hawkins | |

FOREIGN PATENT DOCUMENTS

| | | | |
|---|---|---|---|
| RU | 2160403 | | 12/2000 |
| SU | 602726 A | * | 3/1978 |
| SU | 954686 A | * | 8/1982 |
| SU | 1048197 A | * | 10/1983 |
| SU | 1075035 A | * | 2/1984 |
| SU | 1571330 | | 6/1990 |

* cited by examiner

*Primary Examiner* — Thomas R Hannon
*Assistant Examiner* — Phillip A Johnson
(74) *Attorney, Agent, or Firm* — Aleksandr Smushkovich

(57) ABSTRACT

The inventive gear drive comprises toothed wheels with teeth of toothed crowns interacting with single- or multi-flow elements. Working profiles of the interacting teeth comprise piecewise and/or pointwise conjugate, convex at a tooth point and concave at a tooth root arc-shaped sections continuously connectable to each other or to involute sections. The interacting toothed crowns are so embodied that a phase gap of the face tooth intermating at a discrete angle from a point, where the interaction of profiles ends at a point, where the interaction of the face profiles of the next tooth pair starts. The drive is so embodied that the face tooth overlap ratio thereof is less than 1. The so improved teeth provide for high level of the contact tightness and absence of axial forces at engagement, increase the structural flexibility of the gear drive teeth in order to improve their qualities.

5 Claims, 12 Drawing Sheets

GEAR DRIVE

CROSS-REFERENCE TO RELATED APPLICATIONS

This application is a U.S. national phase application of a PCT application PCT/RU2005/000367 filed on 5 Jul. 2005, published as WO2007/008096, whose disclosure is incorporated herein in its entirety by reference.

FIELD OF THE INVENTION

The invention relates to machinery, specifically to gear drives. The most successful possible use of this invention is proposed for various devices with heavy loaded toothed wheels.

BACKGROUND OF THE INVENTION

Involute (or evolvent) gear drives are known (F. L. Litvin "Teoriya zubchatykh zatsepleniy", Moscow, Nauka, 1968, 584 pp.), that comply with the basic law of meshing by means of intermating tooth face profiles of paired wheels, with the following overlap ratio ($\epsilon_\alpha$) and total overlap ratio ($\epsilon_\gamma$): $\epsilon_\alpha \geq 1$ and $\epsilon_\gamma \geq 1$. The involute gear drive has some disadvantages, such as low structural flexibility of the tooth face profile (danger of edge engagement phase and presence of pole engagement phase, low degree of tooth contact tightness) and high sensitivity to process and deformation irregularities of the tooth contact along a line of teeth.

Novikov's spatial 'out-of-pole' (herein further called 'extra-pole') gear drive is known (M. L. Novikov "Zubchatye peredachi s novym zatsepleniem", published by VVIA im. N. E. Zhukovskogo, 1958, 186 pp.), and satisfies the basic law of meshing by means of axially intermating teeth with addendum mating ($\epsilon_\alpha = 0$) of their face profiles, convex of radius $\rho_\alpha$ at a tooth addendum and concave of radius $\rho_f$ at a tooth dedendum, $\Delta\rho = \rho_f - \rho_\alpha > 0$. The Novikov gear drive has disadvantages such as low structural flexibility—lacking a principle ability to design a spur gear and/or narrow-crown drive, necessity to choose the value of $\Delta\rho \gg 0$, low degree of tooth contact tightness, and its increased sensitivity to process and deformation irregularities of shape.

Spatial gear drives of mixed engagement are known (G. A. Zhuravlev, Gear Drive, USSR Inventor's Cerificate No. 1185942, IPC F16H1/08, Pri. 20.05.1975, Bulletin No. 15, 2004), with axially intermating teeth, where extra-pole pointwise conjugate sections of the tooth face profiles are circumscribed by concave line of radius $\rho_{ass}$ at a tooth addendum and convex line of radius $\rho_{fss}$ at a tooth dedendum, $\rho_{ass} - \rho_{fss} > 0$, connectable by involute sections with profile angle of base tooth contour $\alpha \gg \alpha_k$, with $\alpha = \alpha_{1\alpha}$ and $\alpha_k < \alpha_{1\alpha}$ ($\alpha_k$ is theoretical pressure angle of extra-pole arc-shaped sections; $\alpha_{1\alpha}$ is profile angle at lower boundary point of main arc-shaped section at a tooth addendum) and increased meshing angle $\alpha_{tw}$.

Due to employment of two effects: (G. A. Zhuravlev "The Mixed Gearing Engagement Systems. Proceedings of Ninth World Congress on the Theory of Machines and Mechanisms", Vol. 1, Italy, Milano, 1995, p.p. 433-437), an effect of the super-additive IP kinematical principle (in contrast to the additive one, with simple adding of engagement components when they are combined in the mixed engagement) and an effect of contact curvature (the effect of considerable, exceeding the one that may be described by a solution of the Hertz flat contact problem, influence of the increasing of contact tightness for elastic bodies to lowering the contact stresses and, as a consequence, revelation of a principle ability to improve greatly pole and extra-pole phases of engagement), such drive is free from lost of the tooth contact surface, contact strength of the pitch point is augmented up to the maximum extent, parameters of the contact durability (pole and extra-pole) of the engagement phases are equalized, and particular features of the shape of its tooth face profile ensure increased smoothness of its operation and low bending stresses.

The known gear drive has certain disadvantages such as limited structural flexibility regarding an increase of contact tightness (and employment of the curvature effect) during phases of extra-pole meshing, as well as in selecting parameters of longitudinal ($\epsilon_\beta \geq 1$) tooth shape.

Spatial gear drives of mixed engagement are known (G. A. Zhuravlev, Mixed-Engagement Gearing, EUROPEAN PATENT No. 0293473, F16H55/08, 29.07.92 and Russian Federation Patent No. 1075041, IPC F16H55/08, Bulletin No. 7, 1984), based on the kinematical principle of mixed IP.

Tooth face profiles comprise involute sections and main pointwise conjugate arc-shaped sections (convex at a tooth addendum and concave at a tooth dedendum, with parameters depending on the sign and absolute levels of inter-axle distance deviations $\Delta\alpha_w > 0$ and $\Delta\alpha_w < 0$), which are continuously connectable to each other by additional arc-shaped sections (small-sized construction sections, using effect of concentrator curvature, i.e. an influence effect of increasing the geometrical concentrator curvature at certain loading parameters, according to a cross bending pattern, onto the lowering of bending stresses: G. A. Zhuravlev, "The Principle of the Kinematical Independence to the Mixed Toothed Engagements. Proceedings of ISMM '97 International Symposium <<MACHINES and MECHANISMS>>, YUGOSLAVIA, BELGRADE, 1-3.9.1997): concave section of radius $\rho_{pa}$ at a tooth addendum and convex section of radius $\rho_{pf}$ at a tooth dedendum.

This approach provides for a kinematical independence principle: involute sections have $\alpha \gg \alpha_{1\alpha}$. Due to a greater teeth overlap and lesser drive sensitivity to the inter-axle distance deviations, active width of toothed crown $b_w$ may be decreased to $b_w \approx 0.7 p_x$ (where $p_x$ is an axial pitch), with considerable improvement of the parameters of its bending durability, vibro-acoustics and service life. The disadvantages of this solution are limitations of structural flexibility regarding employment of the curvature effect and increase of contact tightness during all engagement phases.

Gear drives of mixed engagement are known (G. A. Zhuravlev, USSR Patent No. 1839700, IPC 5F16H1/20, 55/08, Pri. 24.09.1986, Bulletin No. 48-47, 1993), formed by multi-flow elements of IP type with shifted engagement phases of tooth face profiles of different pairs of interacting toothed crowns, e.g. composite wheels. In each individual pair of the interacting toothed crowns, involute (at $\alpha \gg \alpha_{1\alpha}$) and pointwise conjugate sections of the tooth face profiles form independent engagement phases with interrupted continuity of their kinematical engagement and discrete existence (only for single points and local portions of the profiles) of the common tangential plane at teeth contact place, ensuring (due to relative offset of the discrete engagement phases) face overlap ratio $\epsilon_\alpha \geq 1$ and intermating of the paired wheels.

The component of pointwise conjugacy of the convexo-concave sections of the tooth profiles is combined with refusal from conditions of axial overlap, forming pitch-line gear contact, increased contact tightness during all engagement phases, lack of axial forces at the engagement. At the same time, the complying with condition $\epsilon_\alpha \geq 1$ imposes limitations on the structural flexibility of the multi-flow IP drive regarding employment of effects of curvature and contact tightness increase.

Gear drives of mixed engagement with face teeth intermating are known (G. A. Zhuravlev, Russian Federation Patent No. 1571330, IPC F16H 55/08, 25.04.1988, Bulletin No. 22, 1990), taken here as prototype (the closest prior art device), based on the mixed IP kinematical principle and the effect of contact curvature.

Tooth face profiles of the IP drive have involute (quasi-involute) sections and extra-pole piecewise conjugate and/or pointwise conjugate (convex at a tooth addendum and concave at a tooth dedendum) sections, mating each other at theoretical points of contact of extra-pole sections ($\alpha=\alpha_k=\alpha_{1\alpha}$), creating inflection at the theoretical point of contact at a tooth dedendum.

The involute sections create independent engagement phase, with a face overlap ratio $\epsilon_\alpha \geq 1$, and have different (by both sides from the inflection) types of contact between tooth profiles at boundary points, from convexo-concave to biconvex. The drive on the whole has contact of pitch-line type without conditions of axial overlap and is characterized by employed curvature effects with increased contact tightness (up to pitch-line contact during extra-pole engagement phases), increased levels of super-additivity of the mixed engagement and structural flexibility of the face and longitudinal tooth shapes. Such parameters like engagement dynamics, combination of running-in ability with wear-resistance, vibro-acoustics, loading capability, and service life of the gear drive are improved.

Limitations of the structural flexibility of the known drive (conditions of face and total teeth overlap $\epsilon_\alpha > 1$ and $\epsilon_\gamma > 1$) restrain the increase of contact tightness (engagement angle $\alpha_{tw}$ and/or height values of the extra-pole pointwise conjugate sections) during various engagement phases and level of super-additivity of the mixed engagement.

BRIEF DESCRIPTION OF THE INVENTION

It is therefore desirable to increase the structural flexibility and contact tightness of the gear drive teeth in order to improve their qualities. The present invention solves this problem by means of introducing series of kinematical principles that are most suitable for employment of the contact curvature effect during various engagement phases.

The problem is specifically solved in such a way that the tooth face profiles include piecewise conjugate and/or pointwise conjugate arc-shaped (convex of radius $\rho_\alpha$ at a tooth addendum and concave of radius $\rho_f$ at a tooth dedendum, with a theoretical pressure angle $\alpha_k$) sections of increased contact tightness, which are continuously connectable to other, for example, involute sections, and have interruptions in the intermating phases of the tooth face profiles at a value of discrete intermating angle $\phi_{D1,2}$; wherein at least one discrete intermating phase of the tooth pair face profiles is formed by the contact of extra-pole convexo-concave sections.

Hereinafter, the gear drives featured with such phases of discrete intermating of the interacting teeth face profiles by their convexo-concave sections are referred to as 'discrete drives', as providing kinematically proper engagement of the tooth face profiles only in its separate phases or piecewisely—with face overlap angles for each of the paired wheel that are lesser than their pitch angles.

Abandonment of the limitations for tooth shapes (face and longitudinal), that are imposed by traditional principles for creating the conjugated toothed wheels, is accompanied by designing non-uniform transmission of rotation, which is compensated by features of the tooth shape exposed during the phase of their face intermating.

Firstly, cyclic and kinematical deviations of the drive are comparable by their levels with allowable irregularities of the actual involute gear drives. Secondly, due to face intermating of the teeth at the extra-pole arc-shaped sections with high contact tightness and effect of the contact curvature in the force engagement, from one hand, requirements for the drive regarding kinematical accuracy, contact of the teeth (positions of the drive axles) and smoothness of operation (cyclic error of tooth mesh frequency) may be lowered and, from the other hand, smooth operation, proper contact patch, slow speed of teeth impact, lowered dynamic load and vibro-acoustic activity, increased loading ability and service life are achieved.

For the teeth of any longitudinal shape, the lower circumferential speed of the interacting toothed wheels and the greater height dimensions of the pointwise conjugate sections, the longer intervals $\phi_{D1,2}$ may be introduced between engagement phases at boundary or theoretical contact points of the intermating sections of the tooth face profiles. Size and contact tightness of the extra-pole sections (by reducing size of the involute sections without increase of $\phi_{D1,2}$) may be augmented basing on mixed engagement super-additivity effect (varying parameters of the involute sections).

However, radically this problem may be solved by shifting like engagement phases of the toothed crowns by $\tau_{p1,2}$ angle, until involute sections are completely deleted thus creating discrete gear drive with multi-flow elements, in particular, consisting of the composite wheels made as stack of two or more coaxial (spur, helical, etc.) crowns joined together with relatively shifted in circular direction like engagement phases of the tooth face profiles.

This also includes combination of the discrete teeth intermatings by different pairs of the interacting toothed crowns and approximately equal angular distances between adjacent points where projections of the normals to the tooth face profiles (at theoretical points of contact K or at distinctive points, e.g. middle or boundary points of the active sections) of all toothed crowns on the face surface of each wheel at the pitch line.

Values of the discrete tooth face intermating angles are taken from the following ratio: $\phi_{D1,2}{}^{1,2,3}\ldots/\tau_{1,2} \leq 0.35$. Lines of a kinematically perfect contact of teeth appear discretely during various engagement phases at various sections throughout the width of the composite wheel and height of its teeth, as distinct from continuous offset of the contact lines or points on surfaces of the traditional gear teeth throughout their height (as in case of spur involute gear drive) or width of the toothed crown (as in case of Novikov gear).

Increasing the uniformity of the intermating phase distribution improves the smoothness of the discrete gear operation, also when wheels are made as two-crown wheels.

The so improved general shape of the teeth (combined face and longitudinal shapes) provides for quite high, not achievable for any other engagement type, level of the contact tightness and absence of axial forces at the engagement. This allows for use advantages of the linear tooth contact and kinematical reserves of extra-pole engagement in full; advantages of the discrete engagement are exposed to the full extent.

Minor changes (during engagement of every tooth pair) in proportions of the contact kinematical parameters, absence of the involute sections of the face profiles (with relatively low structural flexibility) and pole phases of tooth pure rolling, as well as increased contact tightness provide for better combination of the wear resistance and running-in ability of the drive, decreased vibro-acoustic activity and sensitivity to manufacturing and rigidness deviations from the shape.

Similar discrete engagement may be used in various multi-flow designs, including planetary gear mechanisms. At any total overlap ratio $\epsilon_\gamma = \epsilon_\alpha + \epsilon_\beta$ ($\epsilon_\alpha$ and $\epsilon_\beta$ are ratios of face and axial tooth overlap, respectively), the drive is designed with the ratio of face tooth overlap less or equal to zero.

An extra-pole variant of the discrete IP drive is recommended (for example, cylindrical, bevel, or worm), that is designed with small-size construction sections of the tooth face profiles in such a way as to locate the upper boundary point of the small convex construction section of the tooth profile of one paired wheel at a tooth addendum, while involute (quasi-involute) profile sections of the interacting teeth form approach or recess engagement phases.

The extra-pole IP drive has no weakened pole sections that allows for increasing (particularly, when $\epsilon_\beta = 0$) its running-in ability and operation reliability, while keeping main advantages of the discrete IP drive.

Moreover, extra-pole discrete IP drives show the effect of contact strength equalizing for tooth addendum and dedendum and so-called "tooth addendum effect". Range of angles ratios $\phi_{D1,2}/\tau_{1,2} \leq 0.4$ determines engagement conditions at $\epsilon_\beta \geq 0.5$, while for $\epsilon_\beta < 0.5$ it should be reasonably decreased to $\leq 0.2$.

It is desirable, especially for the bevel, hypoid and other drives with the relative position of wheel axles being changed during operation, to design the discrete drive as to obtain each extra-pole arc-shaped section of the identical base tooth contour pair mixed and circumscribed according to different laws, with inflections at theoretical points of contact, and extra-pole addendum and dedendum sections continuously interconnected, e.g. by involute section, or conjugated at a point with profile angle $\alpha_c$.

The drive may be designed with discrete intermating at the theoretical points of contact and decreased total overlap ratio $\epsilon_\gamma$, e.g. at $\epsilon_\gamma = 0$. Values of the discrete face intermating angles are taken from the ratio $\phi_{D1,2}/\tau_{1,2} \leq 0.25$. Due to section curvatures by both sides from the theoretical point of contact, opposite in signs to each other, such drive is virtually insensitive to deviations of the inter-axle distance $\Delta\alpha_w > 0$.

In various discrete drives, pointwise conjugate extra-pole sections of the tooth pair profiles near pressure angles exceeding value of theoretical pressure angle $\alpha_k$ may be circumscribed by smooth curves that approach to circular arcs with the closest possible technologically radii of curvature, if allowable deviations of geometrical and assembling parameters are assumed as equivalent to increase of the cylindrical wheels' inter-axle distance or bevel wheels' axle setting.

This, on the one hand, introduces a kinematical principle of curvature radii of the pointwise conjugate extra-pole sections of the tooth face profiles selected regardless from drive geometrical deviations, which are equivalent to inter-axle distance changes, and, on the other hand, these deviations determine only the actual (the maximally achievable) contact tightness (up to the surface one) for sections $\alpha > \alpha_k$ of the teeth (i.e. during the most critical phases of their intermating), adequate to every stochastically shown level of deviation, as well as a value of the actual side clearance in the engagement.

To obtain greater heights of the pointwise conjugate sections, e.g. in one of directions of rotation, teeth of the discrete gear drives are made with asymmetrical face profile.

The technical result and positive effect (compared with the prior art) follow: the invention improves structural flexibility and tooth contact tightness; reduces the sensitivity of engagement to the geometrical deviations, thus allowing low levels of contact (surface and subsurface) and bending stresses, contact temperatures; less number of teeth and better arrangements of the toothed wheels; tooth shapes that lower the loading of supports; extra lightweight designs of the toothed wheels; lower vibro-acoustic activity (from 1 to 4 dBA), size, weight, content of metal per weight unit, cost; less strict requirements for lubrication and heat removal conditions of the power gear train; simplified production technology; improved running-in ability, efficiency, specific speed, loading and overloading capabilities (up to 2 times) and service lifespan (up to 10 times).

The claimed technical solution complies with the "Novelty" (N) criterion: it introduces new original kinematical principles that lead to the discrete teeth engagement. The invention complies with the "Inventive Step" (IS) criterion: its provisions are not obvious and not covered by traditional approaches, including the basic law of meshing. The claimed technical solution complies with the "Industrial Application" (IA) criterion, because it may be widely used and its implementation does not require fundamental changes in manufacturing technology.

BRIEF DESCRIPTION OF DRAWINGS

Other goals and advantages of the invention may be clarified by the following specific example designs and drawings that demonstrate.

PREFERRED EMBODIMENTS OF THE INVENTION

Figure 1:
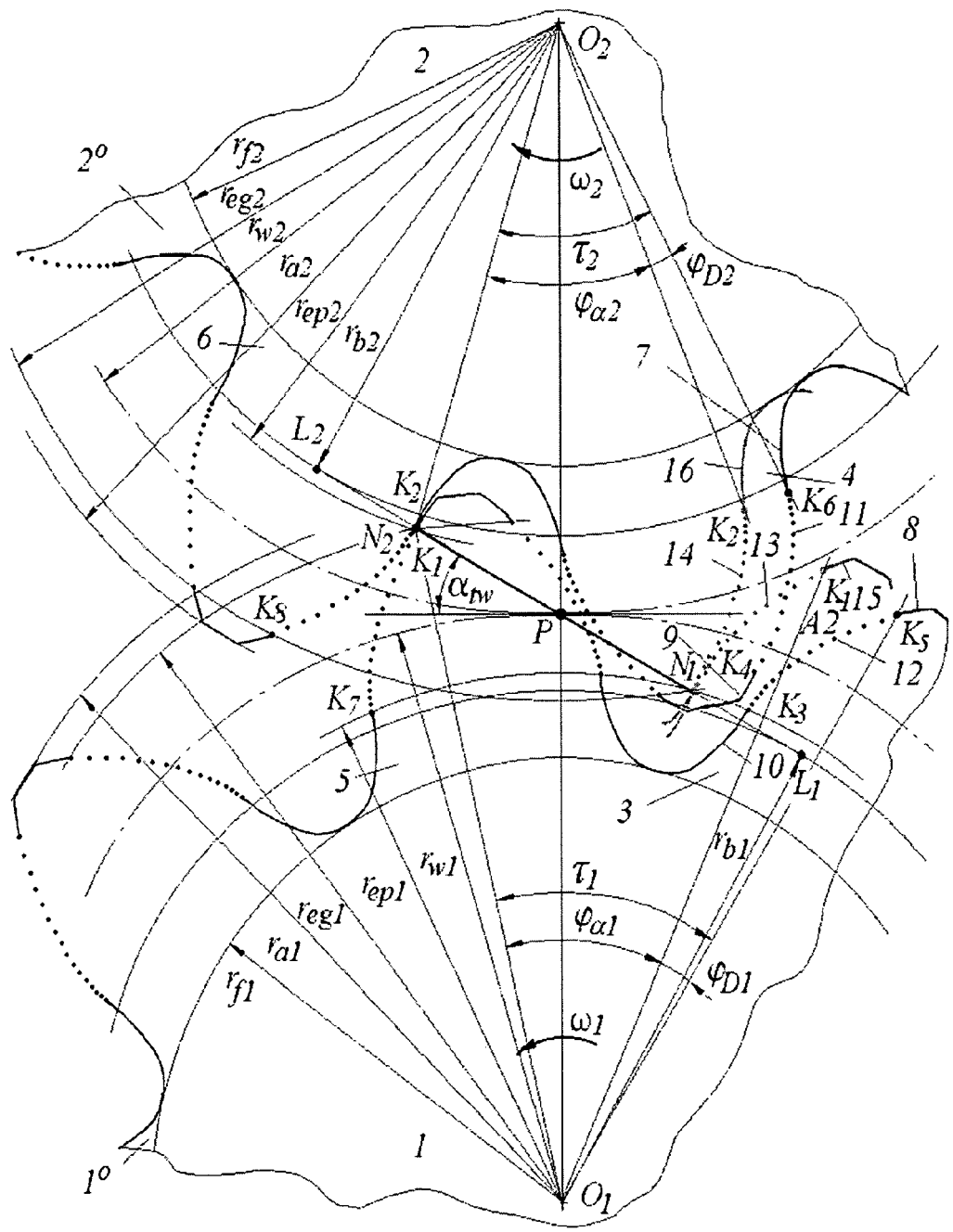
FIG. 1: Schematic view of a single-flow gear drive designed with application of the invention, with the wheels interacting in the kinematical engagement (sectional views of which are shown in the face planes) during the recess phase of the tooth face profiles.

While the invention may be susceptible to embodiment in different forms, there are shown in the drawings, and will be described in detail herein, specific embodiments of the present invention, with the understanding that the present disclosure is to be considered an exemplification of the principles of the invention, and is not intended to limit the invention to that as illustrated and described herein.

A cylindrical gear (shown on FIG. 1) is designed according to the invention, and can be used in a heavy-duty drive, formed by toothed wheels (1) and (2) (with axles $O_{1,2}$ and circles: pitch, top and dedendum, of radii $r_{w1,2}$, $r_{a1,2}$ and $r_{f1,2}$, respectively) that rotate with angular speeds $\omega_1$ and $\omega_2$. Hereinafter parameters marked by subscripts 1 and 2 refer to the paired wheels 1 and 2, respectively.

Side surfaces of face profiles of interacting teeth (3)-(4) and (5)-(6) on the toothed crowns 1° and 2° comprise pointwise conjugate extra-pole arc-shaped (convex of radius $\rho_a$ at a tooth addendum and concave of radius $\rho_f$ at a tooth dedendum with theoretical points of contact $K_1$, $K_2$, ..., $K_8$ and pressure angle $\alpha_k = \alpha_{tw}$) sections (8) and (7), (9) and (10), and involute sections (11) and (12) (with pitch circles of radii $r_{b1,2}$ and an engagement angle $\alpha_{tw}$, shown by dotted lines (located between the circles of their upper and lower boundary points, of radii $r_{ep1,2}$ and $r_{eg1,2}$, respectively), continuously interconnectable at the points $K_{3,4,5,6}$.

In the recess phase shown in FIG. 1, teeth 5 and 6 contact at the point $N_2$, which coincides with theoretical points of contact $K_1$ and $K_2$ of the extra-pole sections of the type 7 and 8 and with boundary points of the involute sections of the type 11 and 12.

When the gear drive is made single-flow and wheels 1 and 2 are integral, with toothed crowns 1° and 2°, the tooth face overlap angle $\phi_{\alpha1,2}$ from meshing phase (conventionally shown in FIG. 1 and FIG. 4 by profile sections 13-14 and 15-16) of teeth 5-6 (at points $K_7$-$K_8$) at the point $N_1$ of engagement line $L_1L_2$ to the disengaging (un-meshing) phase at the point $N_2$, is less than the value of the angle step $\tau_{1,2}$.

Face profiles of the next tooth pair, 3 and 4, don't touch each other and form phases of discrete (with mating only at single points $N_1$ and $N_2$) face intermating (with phase interruption), for example, at an angle $\phi_{D1,2} \leq 0.15\tau_{1,2}$, with a face overlap ratio $\epsilon_\alpha < 1$ in case of any tooth longitudinal shape, including when the face overlap ratio $\epsilon_\gamma = \beta_\alpha + \epsilon_\beta < 1$.

Because of the abandonment of traditional conditions regarding the overlap (such as $\epsilon_\alpha > 1$ or $\epsilon_\gamma > 1$), this drive has increased heights of the pointwise conjugate sections 7-8 and 9-10 and/or the value of engagement angle $\alpha_{tw}$ of the involute sections, resulting in increased tooth contact tightness in all (or the most critical) engagement phases, effects of contact curvature and super-additivity of the mixed engagement, structural flexibility and loading ability of the gear drive.

For example, for a cylindrical IP spur gear of mixed engagement, the value of $\epsilon_\alpha$ lowered from $\epsilon_\alpha = 1.2$ to $\epsilon_\alpha = 0.944$, allowed to increase the engagement angle $\alpha_{tw}$ from $\alpha_{tw} = 23°$ to $\alpha_{tw} = 27°$, and to increase the height of the pointwise conjugate section at a tooth addendum of the wheel $z_1 = 11$ from 0.116 m to 0.387 m (wherein m is a module).

Figure 2:
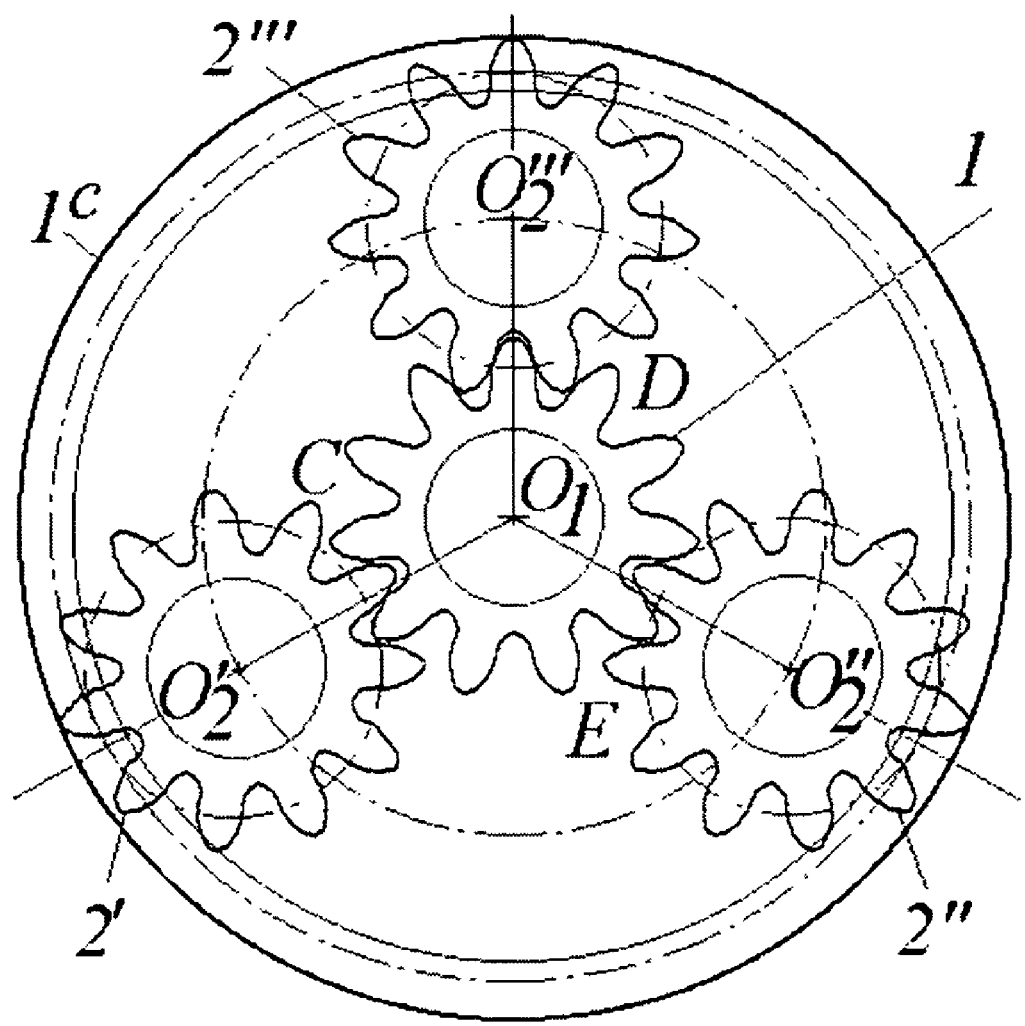
FIG. 2: Schematic view of a multi-flow gear drive designed with application of the invention (in the kinematical engagement), with the toothed wheels interacting in three engagement zones (C, D and E).

The dimensions and role of the extra-pole pointwise conjugate sections increase even more, with concurrently decreasing sizes (or completely eliminated) of the involute sections of the face profile, characterized by lowered structural flexibility, in a multi-flow discrete drive embodiment (shown on FIG. 2), wherein the central wheel 1 on the axle $O_1$ and the co-axial crown wheel $\mathbf{1}^c$ (its teeth not shown for clarity) interact with the three wheels 2 (2', 2" and 2''') mounted on different axles ($O_2'$, $O_2''$ и $O_2'''$) and forming three flows of power (by zones C, D and E), with relatively shifted engagement phases of the wheel 1 with the wheels 2', 2" and 2'''.

Figure 3:
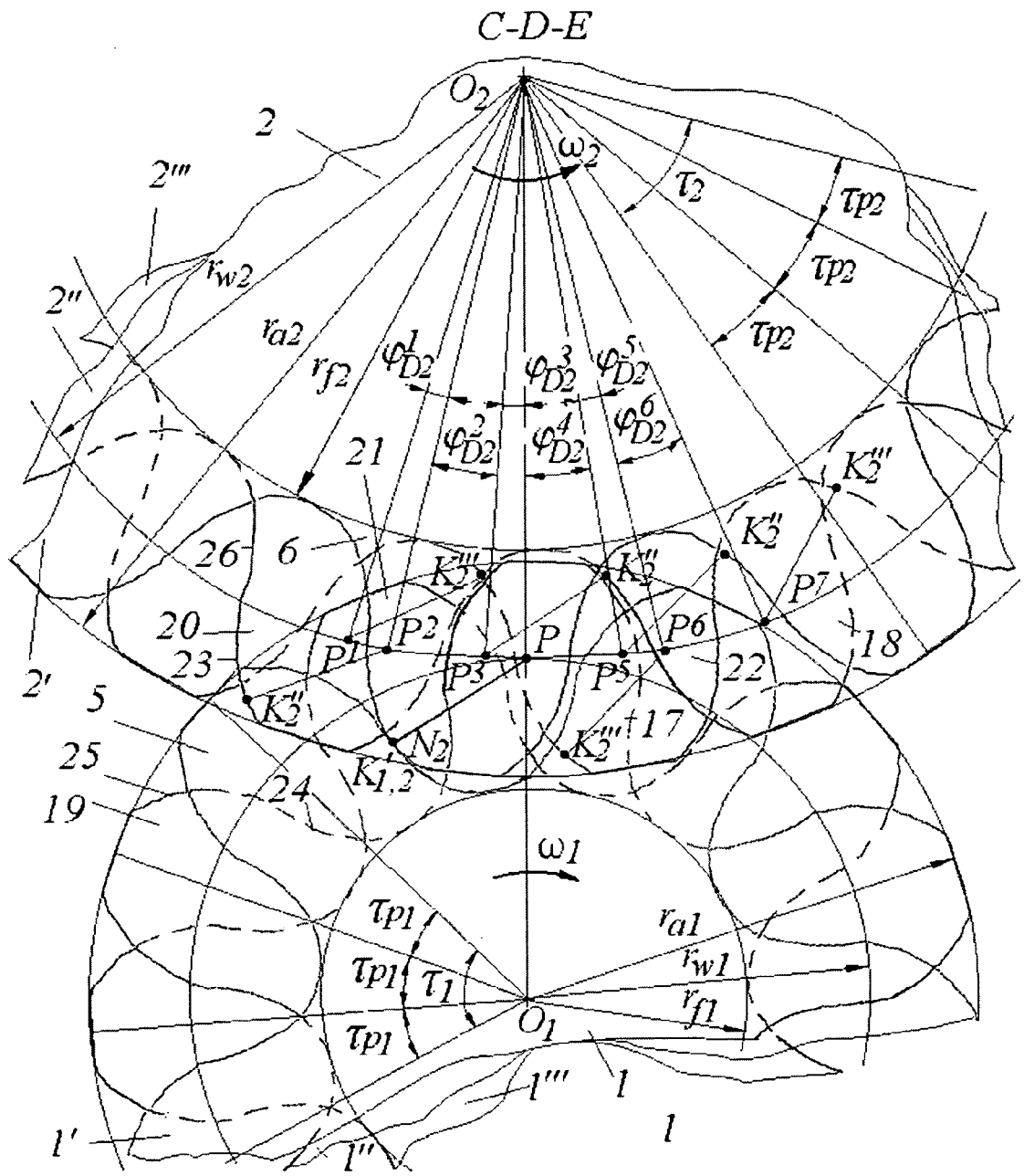
FIG. 3: Schematic view of a multi-flow gear drive designed with application of the invention (in the kinematical engagement), with the toothed wheels interacting in three engagement zones (C, D and E), each of them is conventionally represented as a composite wheel with three co-axial toothed crowns (sectional views of which are shown in different face planes).

To more conveniently analyze the shifted phases, FIG. 3 presents schematically a multi-flow drive (in the kinematical engagement) with toothed wheels interacting in three engagement zones (C, D and E), conventionally shown as three-crown composite wheels 1 and 2 with co-axial toothed crowns 1', 1", 1''' and 2', 2", 2''' (their sectional views are given in different face planes) that are evenly shifted relatively to each other at an angle $\tau_{p1,2}$.

The tooth face profiles discretely (at $\phi_{\alpha1,2} = 0$) form extra-pole engagement phases at the pointwise conjugate (convex at a tooth addendum on one wheel and concave at a tooth dedendum on the paired wheel) sections 23 and 26, 25 and 24, when normals to the profile at the theoretical points of contact $K_{1,2}$ pass through an engagement pole point P: teeth 5 and 6 of the crowns 1' and 2' (points $K'_{1,2}$) contact each other at the point $N_2$ (FIG. 3).

As the points (e.g., points $P^1$, $P^2$ ... $P^7$ for the teeth of the wheel 2) subsequently consecutively coincide with the engagement pole point P, the discrete face intermating angles also alternate: $\phi_{D2}^1$ (from dedendum of tooth 22 on crown 2''' to addendum of tooth 20 on crown 2"), $\phi_{D2}^2$ (from addendum of tooth 20 on crown 2" to dedendum of tooth 18 on crown 2"), $\phi_{D2}^3$ (from dedendum of tooth 18 on crown 2" to addendum of tooth 6 on crown 2'), etc.

Figure 4:
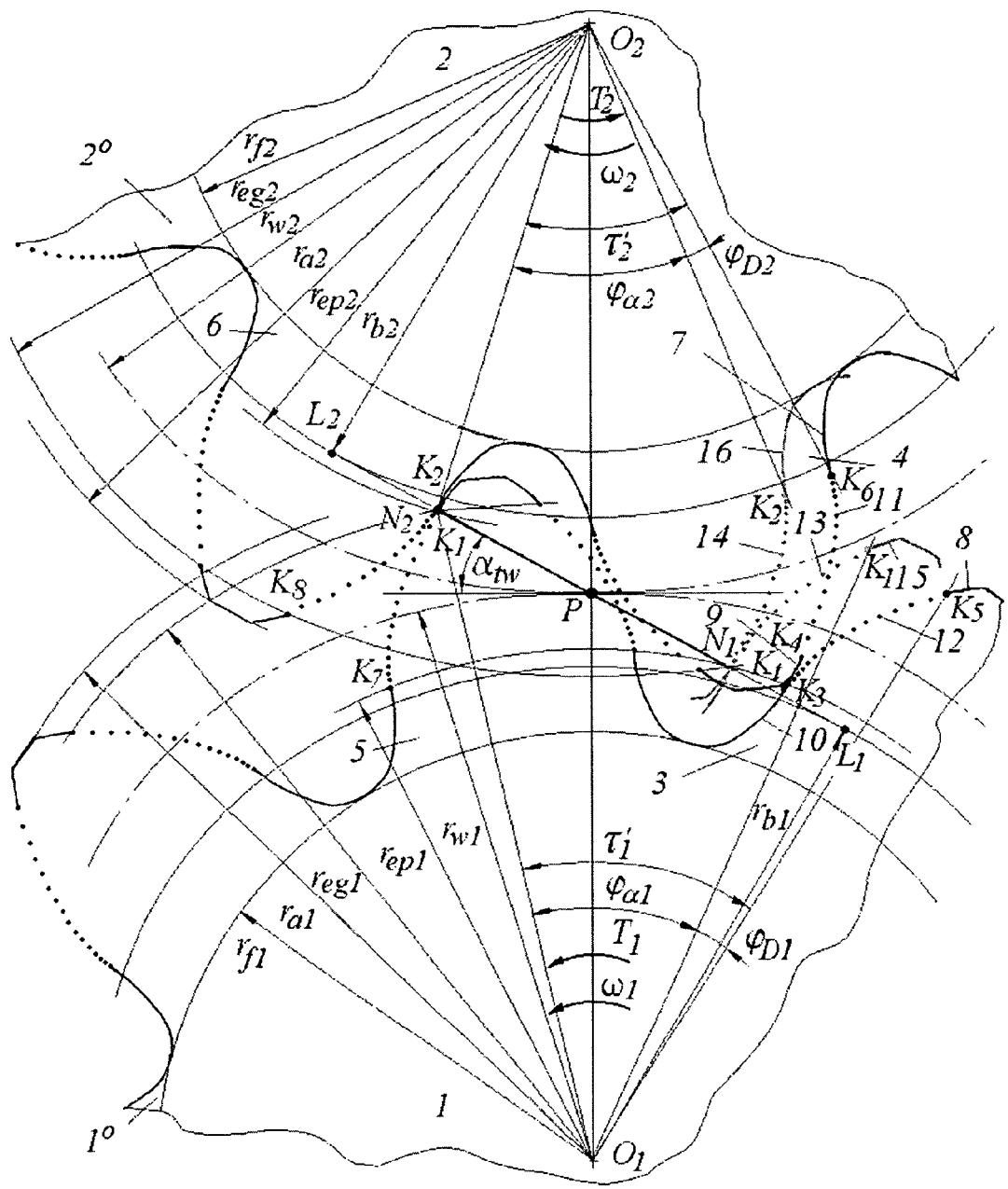
FIG. 4: Schematic view of a single-flow gear drive with paired wheels during the recess phase of the tooth face profiles in their power engagement.

Gaps created in the kinematical engagement between the tooth working profiles in power engagement (at torques $T_{1,2} \neq 0$) are taken up (absorbed) partially or completely. The tooth step of the driving wheel in a single-flow drive decreases ($\tau'_1 < \tau_1$) and the tooth step of the driven wheel increases ($\tau'_2 > \tau_2$) (FIG. 4 shows the disengaging or un-meshing phase for deformed teeth 5 and 6). Therefore, edge (or almost edge) contact of teeth 3 and 4 may occur, with an initial touch at the point $K_t$.

Depending on geometrical parameters of the extra-pole pointwise conjugate sections and the extent of drive load, point $K_t$ may be situated on the involute section 12 of tooth 3 face profile (as shown in FIG. 4) or on its concave section 10. In any case, point $K_t$ moves down along the tooth 3 face profile, creating (as toothed wheels rotate and the extent of load for teeth 3-4 rises) tight contact between convex sections 9 and concave sections 10—until the point of contact changes its direction of movement to the opposite (upward along the tooth 3 face profile) and coincides with the theoretical points of contact $K_{3,4}$ and initial point $N_1$ of the working section $N_1N_2$ of engagement line $L_1L_2$ (forming convexo-concave and biconvex contacts—on both sides from the inflection point $K_3$ of the tooth 3 face profile) and farther—up to the upper boundary points $K_5$ and $K_6$ where involute sections 8 and 9 have contact.

Tightness of the teeth contact rises as they are meshing (accompanied with an increase of their loading up to a maximum level) and lowers as they are un-meshing (accompanied with decrease of their loading up to a zero level).

There is a gap between the working profiles of teeth 5-6 at the point $N_1$ when teeth 3 and 4 are in the phase of kinematical meshing. When under load, steps of the deformed teeth 3-4 and 5-6 increase ($\tau'_1 > \tau_1$) or decrease ($\tau'_2 < \tau_2$) that most often compensate this gap and tight contact appears between teeth 5 and 6.

Figure 5:
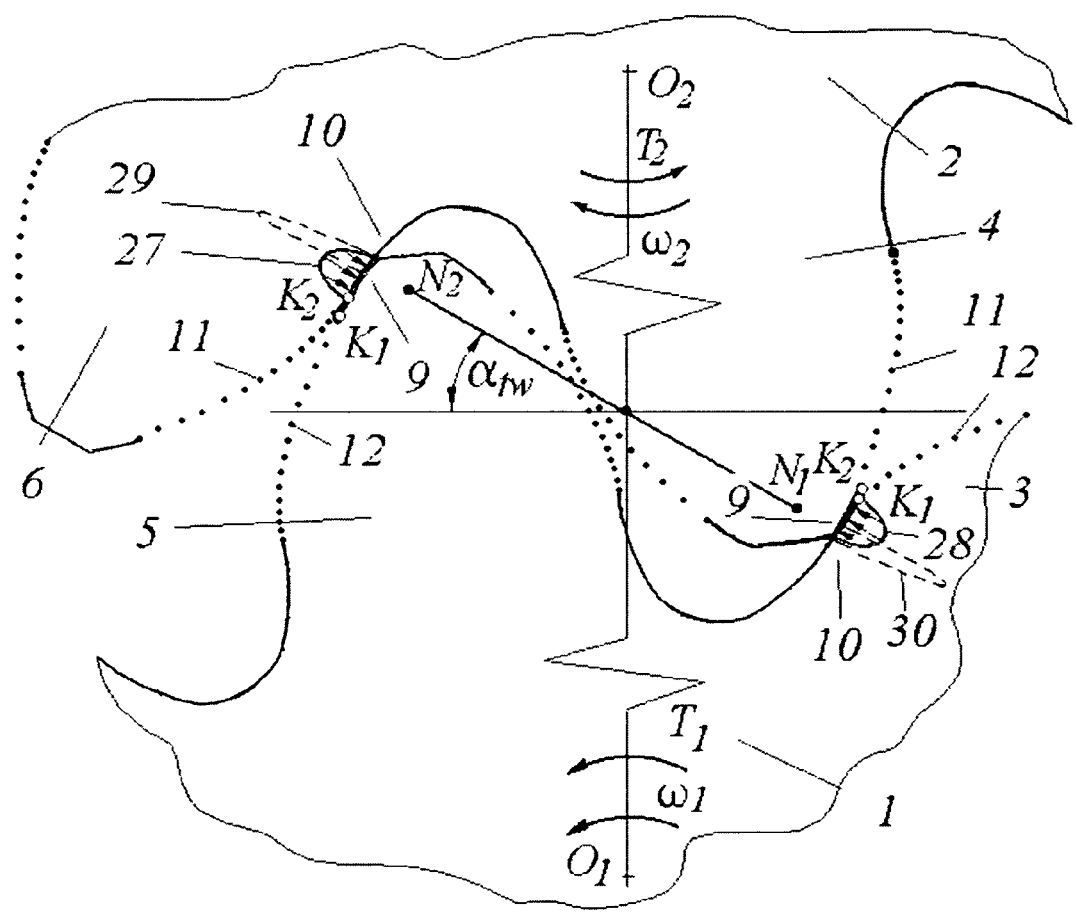
FIG. 5: Phase of power teeth intermating of a single-flow cylindrical gear drive with integral wheels.

The process of power engagement of the teeth 5-6 (after their kinematical intermating at the point $N_2$) is similar to the meshing process for the teeth 3-4, but is opposite to the latter in terms of order. Sections of the tooth working profiles (depicted in FIG. 5) with increased contact tightness create smooth (without abrupt changes of engagement rigidity) discrete intermating.

Distribution lines 27 and 28 indicate normal contact stresses in teeth 3 and 4, 5 and 6, compared with distribution lines 29 and 30, which are typical for edge contact of teeth with little heights of pointwise conjugate sections of working profiles at a tooth addendum.

The distribution lines qualitatively characterize proportions of temperature outbursts at the teeth contact place. The main period of load redistribution coincides with the most favorable phase, when both pairs of teeth have convexo-concave contact beyond the involute sections. The use of extra-pole pointwise conjugate sections of the tooth face profiles with initially linear touching during the phases of power (multi-pair and single-pair) engagement (at $\beta=0$) or with initially linear touching within the mixed engagement IP (at $\beta \neq 0$) allows increasing their performance, efficiency ratio and running-in ability, and lowering level of vibro-acoustic activity of the drive, sensitivity to contact geometrical discrepancies and hazard of drive seizure.

Figure 6:
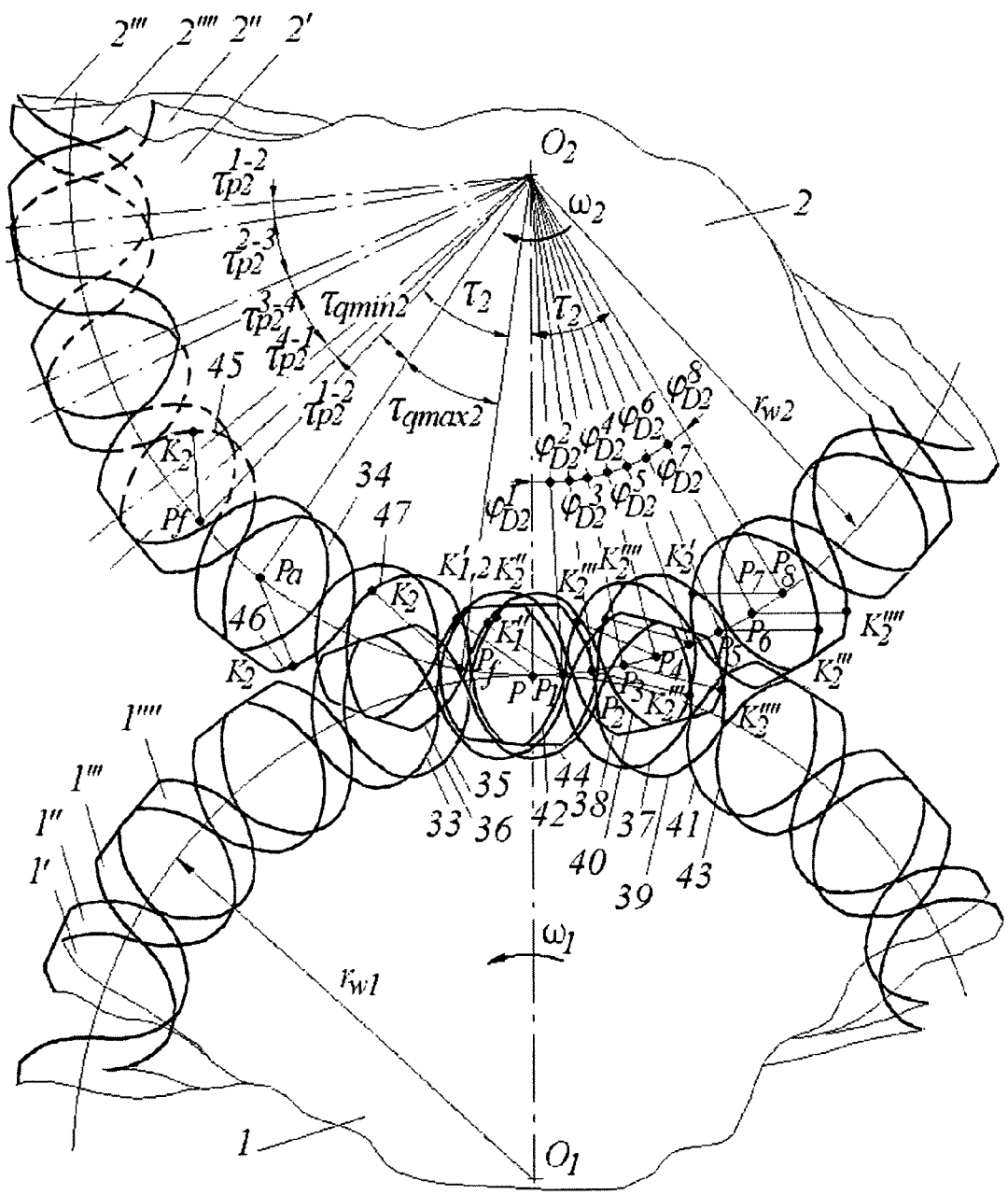
FIG. 6: Gear drive with composite wheels comprising four toothed crowns in each, unevenly relatively shifted.

Improvement of tooth face intermating parameters in a multi-flow drive, lowered excitation of frequency oscillations zNP (where z is number a of teeth on a toothed crown, P is a number of pairs of toothed crowns in a pair of multi-crown composite wheels that interact with shifted engagement phases, N is a number of arc-shaped sections on working tooth profile) is achieved (in FIG. 6, not visible tooth profile sections are conventionally shown by dashed line only in the left-hand part of the four-crown wheel 2) by combination of discrete teeth intermating (33-34, 35-36, 37-38, 39-40, 41-42, 43-44, etc.) from different pairs of the interacting toothed crowns, and with same angular distances ($\phi_{D1,2}^1 = \phi_{D1,2}^2 = \ldots = \phi_{D1,2}^8$) between adjacent points where projections of normals to the working profiles at theoretical points of contact $K'_{1,2} \ldots K''''_{1,2}$ of all toothed crowns on the face surface of each wheel intersect the pitch line of said wheel, with total overlap factor $\epsilon_\gamma = 0$.

The working profile 45 contains two extra-pole arc-shaped sections 46 and 47, and values of relative angular offsets of like engagement phases of the tooth face profiles located on consecutively interacting pairs of the toothed crowns $\tau_{1,2}$ are taken as $\tau_{p1,2}^{1-2} = \tau_{p1,2}^{3-4} = 0.5\tau_{q\ min\ 1,2}$ and $\tau_{p1,2}^{2-3} = \tau_{p1,2}^{4-1} = 0.5\tau_{q\ max\ 1,2}$, depending on parameters of maximum $\tau_{qmax\ 1,2} = \frac{3}{4}\tau_{1,2}$ and minimum $\tau_{qmin\ 1,2} = \frac{1}{4}\tau_{1,2}$ values of angular distance between adjacent points $\rho_\alpha$ and $\rho_f$, where normals to the working tooth profiles of individual toothed crown intersect at theoretical points of contact (some points $K''''_2$ are conventionally shown in the drawing as $K_2$) the pitch line and determined, for example, from the following equations:

$$(\tau_{p\ max 1,2} - \tau_{p\ min 1,2})/\tau_{qmin1,2} = 1, \text{ if } \tau_{1,2}/(P\tau_{qmin\ 1,2}) < 1; \quad (1)$$

$$\tau_{p\ max 1,2} \approx \tau_{p\ min 1,2}, \text{ if } \tau_{1,2}/(P\tau_{qmin1,2}) > 1; \quad (2)$$

and values of angles of discrete tooth face intermating are taken from the following equation:

$$\phi_{D1,2}^1 \approx \phi_{D1,2}^2 \approx \ldots \approx \phi_{D1,2}^8 = \min(\tau_{p\ min 1,2}, \tau_{qmin1,2}) \quad (3)$$

Figure 7:
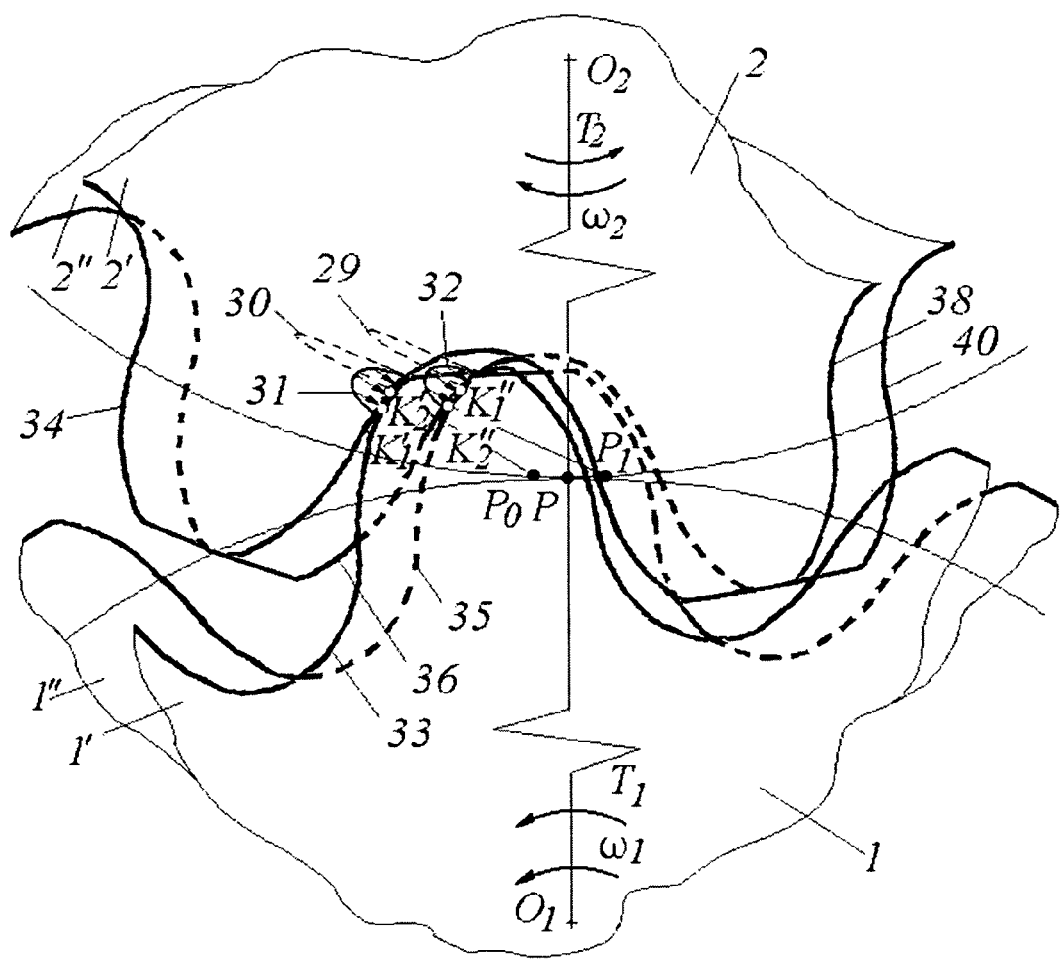
FIG. 7: Phase of power teeth intermating of a multi-flow cylindrical gear drive with composite wheels.

Power intermating (FIG. 7) of teeth 33-34 and 35-36 of the composite multi-crown wheels (with points $P_0$ and $P_1$ where projections of normals to the working profiles at points $K'_2$ and $K'''_2$, which do not coincide with pole point P, intersect the pitch line) occurs with deforming changes of relative offsets of the toothed crowns 1'-1'' and 2'-2'' from coincidence phase (FIG. 6) of the points $K'_1$ and $K'_2$ ($\tau_{p1} < \tau_{p1}^{1-2}$ and $\tau_{p2} > \tau_{p2}^{1-2}$) to position of the wheels 1 and 2 illustrated by FIG. 7, and $\tau_{p1} > \tau_{p1}^{P1-2}$, $\tau_{p2} < \tau_{p2}^{1-2}$—from this position to coincidence phase of the points $K''_1$ and $K''_2$.

Therefore teeth 33-34 (after leaving kinematical engagement phase) and teeth 35-36 (not reached yet kinematical engagement phase) maintain the power contact. Contact stress distribution lines 31 and 32 demonstrate increasing contact tightness against a background of distribution lines 29 and 30 for contact of the extra-pole pointwise conjugate sections with low heights.

Non-uniform offsets of four disks $$\tau_{p1,2}^{1-2} = \tau_{p1,2}^{3-4} = \frac{\tau_{1,2}}{8}$$

and $$\tau_{p1,2}^{2-3} = \tau_{p1,2}^{4-1} = \frac{3}{8}\tau_{1,2}$$

found from equation (1) for each one of the paired composite wheels provide for uniform distribution $\phi_{D1,2}^1 = \phi_{D1,2}^2 = \ldots = \phi_{D1,2}^8 = 0.125\tau_{1,2}$ of the discrete tooth intermating phases with initially linear, near-surface, contact of the teeth.

Figure 8:
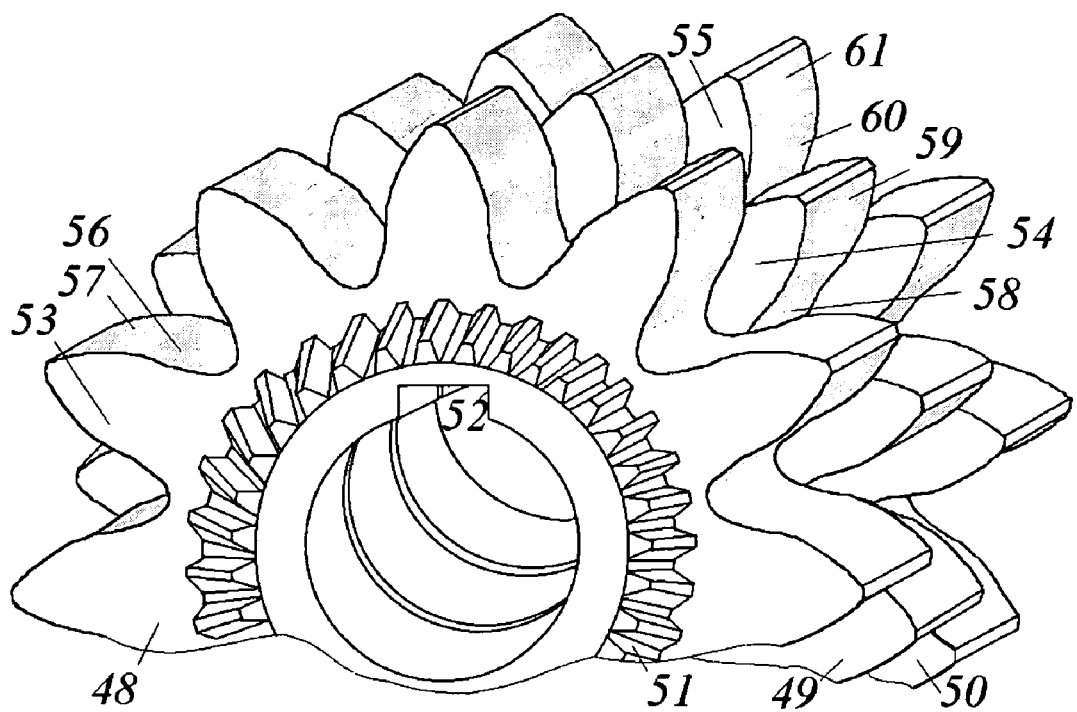
FIG. 8: Fragment of a three-crown composite toothed wheel of the extra-pole drive with patches of integral contact on the side surfaces of the teeth.

Toothed crowns 48, 49, and 50 with disk-type treads (illustrated on FIG. 8) of the three-crown composite wheel are shifted related each other and joined together by elements 51 of the face Curvic coupling. A key groove 52 serves for mounting the wheel to the shaft.

Spots of integral contact may be seen on the side surfaces of the teeth 53, 54 and 55 of different toothed crowns (after short-term power rotation with the paired wheel), separated by addenda and dedenda of the teeth—56 and 57, 58 and 59, 60 and 61, respectively.

Such design allows exclusion of the pole phase and involute engagement sections, whereas the size of the pointwise conjugate sections of face profiles and loading ability of the drive are increased considerably.

Figure 9:
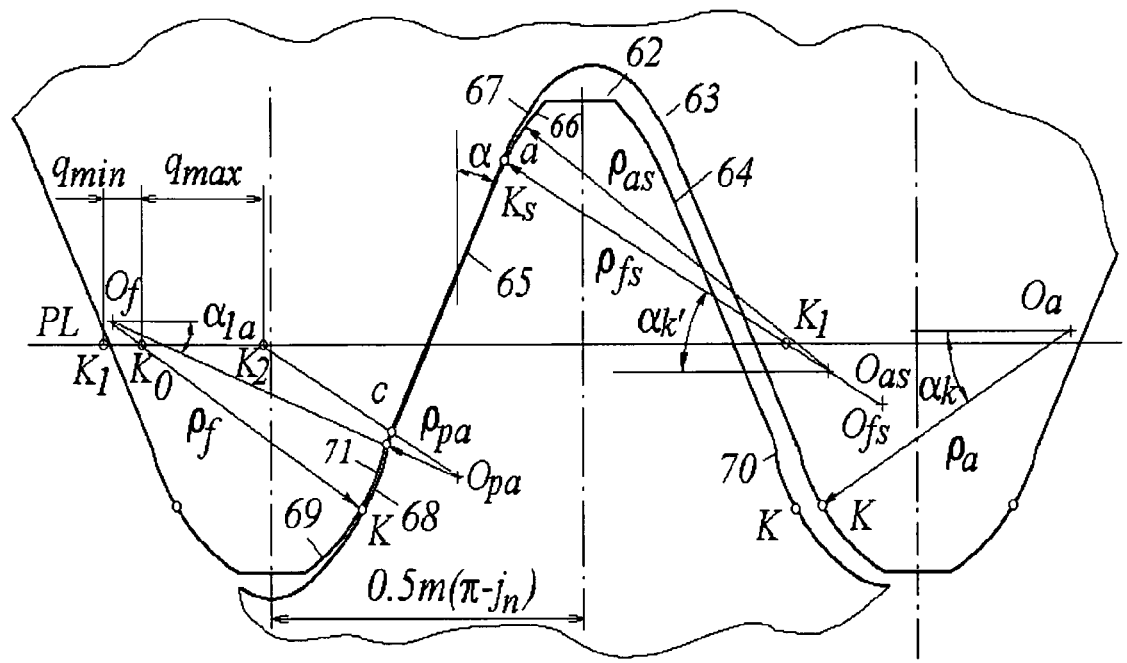
FIG. 9: Pair of non-identical base tooth contours of the drive with pointwise conjugate arc-shaped sections of two types being connected with the involute section directly at a point (e.g., for the approaching sections) and by means of small-size construction sections (e.g., for the recessing sections).

In order to improve wear resistance of discrete IP drives, the side profiles of pair of base tooth contours 62 and 63 (FIG. 9, wherein m is a module, $j_n$ is a side gap factor) contain rectilinear (involute) sections 64 and 65 with a profile angle $\alpha$, which are smoothly connected with two main extra-pole arc-shaped sections 66-67 (at $\alpha'_k = \alpha'_{1\alpha} = \alpha$) and 68-69 (at $\alpha_{1\alpha} < \alpha_k$, $\alpha_{1\alpha} < \alpha$).

The connection is realized through small-size construction sections 70 at the dedendum of the tooth 62 and 71—at the addendum of the tooth 63. Tooth intermating phases by the involute sections at the points $K_1$ and $K_2$ are separated by two intervals, $q_{min}$ and $q_{max}$, with a contact point $K_0$ of the pointwise conjugate sections 68-69.

Figure 10:
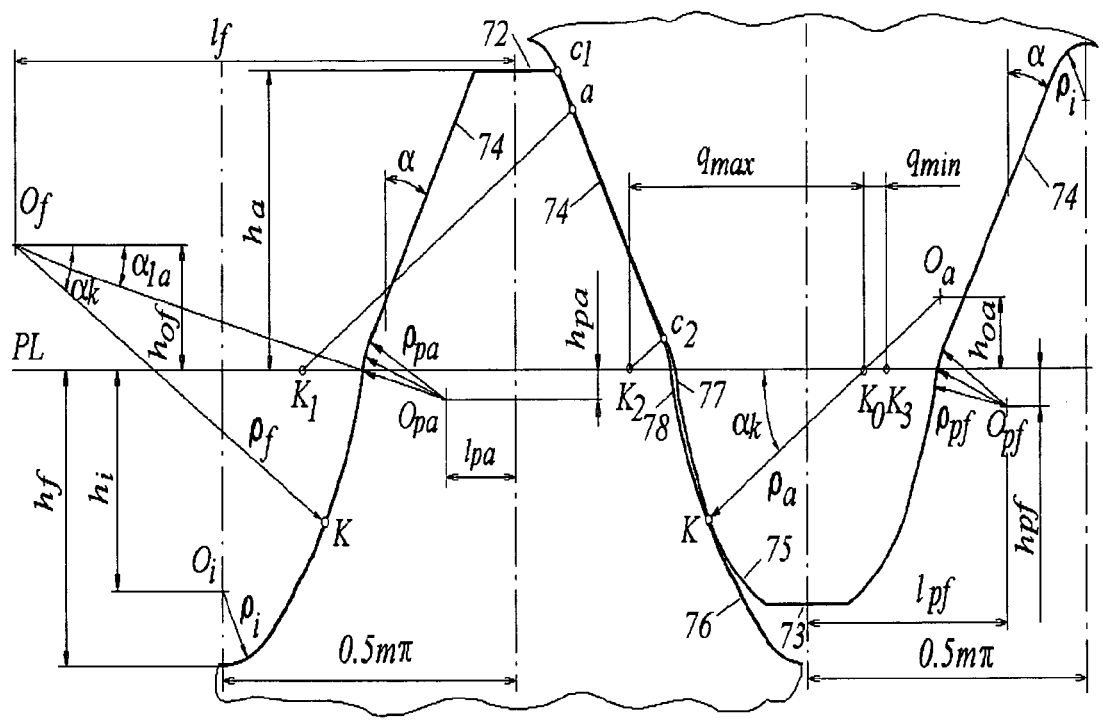
FIG. 10: Pair of non-identical base tooth contours of the extra-pole drive with pointwise conjugate arc-shaped sections connected with extra-pole involute sections by means of small-size construction sections.

The extra-pole IP drive, designed on the basis of pair of base tooth contours 72-73 (FIG. 10), comprises involute (rectilinear) sections 74 and pointwise conjugate sections 75 and 76 (with a theoretical angle $\alpha_k > \alpha_{1\alpha}$), which are interconnected through small-size construction sections 77 and 78 of the tooth profile in such a way as involute sections 74 of the interacting tooth profiles form phases of approach or recess meshing, with separation of the intermating phases at the points $K_1$ (for an upper boundary point a of the actual wheel profile) and $K_2$ by two intervals, $q_{min}$ and $q_{max}$, with a contact point of the pointwise conjugate sections.

This improves structural flexibility of IP engagement: the pole sections, that are weakened regarding contact interacting kinematics, are excluded from operation, thus allowing for increased running-in ability and operation reliability, while keeping main advantages of the IP drive with $\epsilon_\alpha<1$.

Moreover, the extra-pole IP drive shows an effect of contact strength equalizing for addendum and dedendum of teeth type 72 on the one of paired wheels, and so-called "tooth addendum effect" is employed to the fullest extent: the paired wheels with teeth of any longitudinal shape may be designed with a greatly enhanced (regarding the effects of tooth contact curvature) approach (or recess) meshing phase, and also with big differences in hardness of the teeth.

Figure 11:
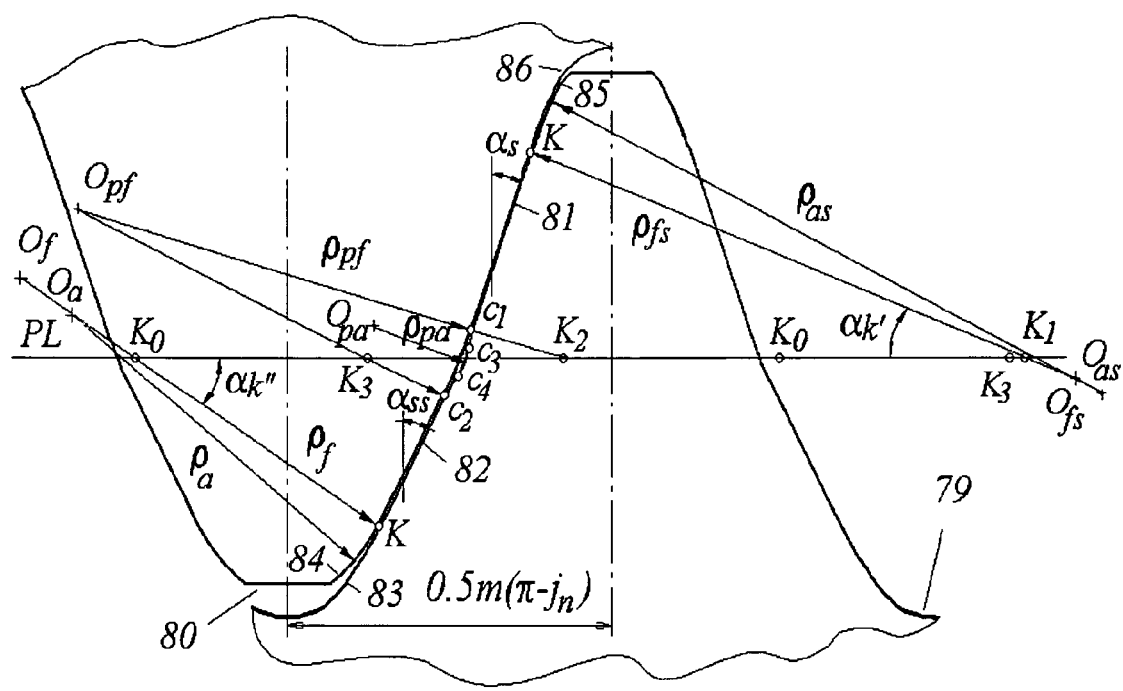
FIG. 11: Pair of non-identical base tooth contours of the extra-pole drive with pointwise conjugate arc-shaped sections connected directly (at the points) with extra-pole involute sections.

The profiles of teeth 80 and 79 (FIG. 11) of the extra-pole discrete IP drive with small-size construction sections $c_1c_2$ and $c_3c_4$ are designed in such a way that an upper boundary point $c_2$ of the small-size convex construction section of the tooth profile of one paired wheel is located at a tooth addendum, and involute sections 81 and 82 of interacting tooth profiles form approach and recess phases of meshing, with partially two-pair engagement and intermating at the pointwise conjugate sections 83-84 (phase $K_0$) and 85-86 (phase $K_1$).

Such partially two-pair IP drive has three most typical engagement periods: single-pair, two-pair, and a period with a lack of overlap $\Delta\epsilon$. The phase of face engagement pointwise conjugate sections at the point $K_1$ is situated between the boundary engagement points $K_3$ and $K_2$ of the involute sections of adjacent tooth pairs, at the disengaging (un-meshing) point $K_3$ of the involute sections of one tooth pair until the meshing point ($K_2$) of the involute sections of the next tooth pair.

The discrete teeth intermating combined with different kinematics of the involute approach and recess meshing improves vibro-acoustic performances and, particularly, the efficiency of extra-pole IP engagement in high-speed drives.

An embodiment of extra-pole discrete drive with variable, during operation, relative positions of the wheel axles is designed without involute engagement phases and each main profile section (89-90 and 91-92, 93-94 and 95-96) of the pair of identical base tooth contours 87-88 (illustrated on FIG. 12) is circumscribed, as mixed one, according to different laws, with creating inflection points that coincide with theoretical points of contact K on basic arc-shaped sections of the face dedendum and addendum profiles, which intermating at the point C with profile angle $\alpha_c$.

Tooth face profiles of biconcave shape have in the kinematically weakened zone of the engagement pole increased mutual retraction, while tooth intermating phases at the points $O_1$ and $O_2$ along the sections 89-90 and 95-96 with interval $q_{min}$ are characterized by favorable profile shape.

The interval $q_{max}$ includes an intermating of the sections 91-92 and 93-94 around their pole engagement phase. Such drive has kinematically correct engagement at the theoretical points K with total overlap ratio $\epsilon_\gamma=0$.

In various discrete drives, extra-pole pointwise conjugate sections, e.g. 89-90 and 95-96, of the profiles of a pair of base tooth contours in the region of pressure angles exceeding a value of theoretical pressure angle $\alpha_k$ are designed with deviations from geometrical parameters, equivalent to the increase of the inter-axle distance $\Delta\alpha_w>0$. The main extra-pole arc-shaped sections of tooth profiles in the region of pressure angles exceeding the value of theoretical pressure angle $\alpha_k$ are circumscribed by smooth curves that approach the circular arcs with the closest possible technologically radii of curvature.

Example: the radii are determined as $$\Delta\rho = \frac{f_f}{\sin(\alpha_{max} - \alpha_k)},$$

wherein $f_f$ is a tolerance value for error of the tooth profile; $\Delta\rho=\rho_f-\rho_\alpha$; $\rho_{\alpha,f}$ are profile curvature radii of convex and concave contacting sections, respectively, of a pair of interacting teeth base contours; $\alpha_{max}$ is maximum profile angle at a tooth addendum.

Due to such design of the discrete drive, tooth contact tightness increases during the phases of their intermating, and sensitivity of engagement to the geometrical deviations is lowered.

Figure 12:
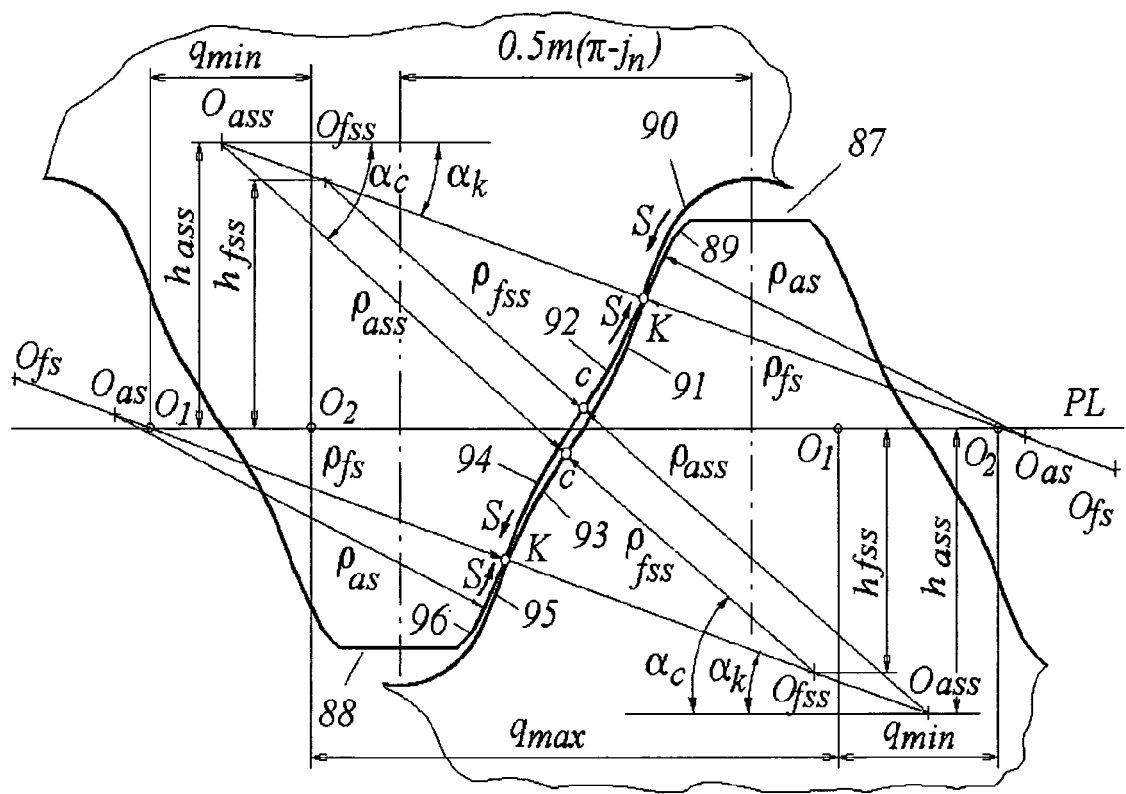
FIG. 12: Pair of base tooth contours of the drive with pointwise conjugate sections of a variable sign curvature.

For example, in the bevel (or cylindrical) gear drive, shown in FIG. 12, this leads to a complete independence of contact point position by height of the face profile from on the actual variations of the axial settings (or inter-axial distance) of the wheels: as they rise, the integral contact spot becomes more localized around the point K (shown in FIG. 12 by arrows ↓S), without changing the initial position of its center along the tooth height.

In such a drive, the actual value of tooth contact tightness is a function of stochastically appearing deviations that are equivalent to varying inter-axle distance, and can reach an extremely high level (up to surface initial touch).

Using the equation above to find the values of $\Delta\rho$, contact tightness may be slightly increased also on the sections 91-92, 93-94, but a practicable rise of their contact tightness is very limited kinematically, so it should be more worthwhile to select parameters for these sections referring to elimination of teeth contact damage during the pole phase of engagement (when the gap has a biconcave shape) or to increase the engagement angle (at the involute engagement in the pole).

Tests of power cylindrical (spur, arc and helical), crossed helical-gear and bevel (with circular-arc teeth) gear drives demonstrated the opportunity to reduce dramatically the cost of products (due to the lower requirements for use of alloyed materials, the chemical, thermal treatment, and finishing of the teeth).

Exemplarily, for the cylindrical drive with module m=2.5-10 mm (with integral or composite steel wheels), the reduction of the cost and, concurrently the increase of the loading ability was indicated as follows: twice at $H_{surf}>HRC57$, $\phi_{D1,2}=0.085\tau_{1,2}$, $\epsilon_\beta=0$, $\epsilon_\gamma=0.915$, and in 1.9 times for three-crown composite wheels $H_{surf}\approx HB320$, $z_{1,2}=29$, $\phi_{D1,2}=\tau 1,2/6$, $\epsilon_\gamma=0$; the increase of the no-failure operating time was more than 10 times at $H_{surf}<HB320$, $\phi_{D1,2}=0.135\tau_{1,2}$, $\epsilon_\beta=1.96$, $\epsilon_\alpha=0.865$; the noise level was reduced by 3-4 dBA at $H_{surf}>HRC58$, $\phi_{D1,2}=0.086\tau_{1,2}$, $\epsilon_\beta=0$, $\epsilon_\gamma=0.914$; the absence of a gear drive seizure was $H_{surf}\approx HB320$, $\phi_{D1,2}=0.062\tau_{1,2}$, $\epsilon_\beta=1.429$, $\epsilon_\gamma=2.367$ under extreme conditions of gapless engagement with axes of the paired wheels misaligned by the value $\gamma=1.45\cdot10^{-3}$ radian; and the reduction of the axial size of a wide-crown helical drive was in 1.67 times: from 150 mm to 90 mm at $H_{surf}<HB320$, $\phi_{D1,2}=0.135\tau_{1,2}$, $\epsilon_\beta=1.176$, $\epsilon_\alpha=0.865$.

INDUSTRIAL APPLICABILITY

The inventive gear drive may be implemented in various areas of technology, and used in various fields of man's activity. Its embodiments may be designed as cylindrical, bevel, hypoid, crossed helical, worm and spiroid gears, and its wheels may be integral or composite, with any longitudinal shape of teeth.

The invention resolves urgent problems of the improvement of power drive performances: increasing the loading ability (up to 2 times), service life (up to 10 times), specific speed, efficiency ratio and wear resistance, decreasing dynamic (vibro-acoustic) activity (by 1-4 dBA) of the engagement, its sensitivity to process and deformation irregularities of geometrical shape, simplifying manufacturing techniques, lowering the size, weight and specific contents of steel; lowering maintenance costs (including due to the lower requirements to lubrication and heat removal), and lesser hazard of drive seizure.

The invention improves structural flexibility of the gear engagement and applies to wide areas of potential use: various transport machines, manufacture of machine-tools, reducers of general purpose and other sectors of the machine-building industry.

Common, widespread equipment is sufficient for production of the gear drive and required gear-machining tools.

The invention claimed is:

1. A gear drive comprising:
a first toothed wheel and a second toothed wheel with $\tau_1$ and $\tau_2$ tooth pitch angles of interacting toothed crowns, with single-flow elements or with multi-flow elements with relative angular offsets $\tau_{p1,2}^{1-2}$ of like engagement phases of successively interacting pairs of said toothed crowns, having face tooth profiles including piecewise conjugate and/or pointwise conjugate convex at a tooth addendum and concave at a tooth dedendum at points of their theoretical contact, extra-pole arc-shaped sections continuously connectable to each other or to other sections;
characterized in that said interacting toothed crowns are arranged with face overlap angles $\phi_{a1,2}$ less than said tooth pitch angles $\tau_{1,2}$ or said relative angular offsets $\tau_{p1,2}^{1-2}$, with creating a gap between phases of tooth intermating equal to a discrete intermating angle $\phi_{D1,2}$ whereat $\tau_{p1,2}^{1-2}=0$ or $\phi_{D1,2}^{1}$ whereat $\tau_{p1,2}^{1-2} \neq 0$ from a disengaging point of said teeth face profiles $N_2$, to an engaging point of said teeth face profiles $N_1$, wherein minimum one said phase is formed by said extra-pole arc-shaped sections and said drive has a tooth face overlap ratio $\epsilon_\alpha<1$ or a total overlap ratio $\epsilon_\gamma<1$.

2. The gear drive according to claim 1 wherein said multi-flow elements comprising composite wheels in the form of stack of two or more co-axial toothed crowns joined together with like engagement phases of tooth face profiles relatively shifted in circular direction;
characterized in that said gear drive has combinations of discrete tooth intermating, including different pairs of said interacting toothed crowns and essentially equal angular distances between adjacent points, wherein projections of normals to the tooth face profiles at said theoretical points of contact, or at distinctive points of active sections of all said toothed crowns on the face surface of each said wheel, intersect the pitch line of the wheel, with a total overlap ratio $\epsilon_\gamma=0$;
and with values of said discrete tooth face intermating angles taken from the following ratio: $\phi_{D1,2}^{1,2,3 \ldots} / \tau_{1,2} \leq 0.35$.

3. The gear drive according to claim 1 comprising a pair of non-identical base tooth contours wherein said face tooth profiles including involute sections, and each of the involute sections is connected with at least one extra-pole arc-shaped section by an additional predeterminedly sized convex construction section and an additional predeterminedly sized concave construction section;
characterized in that said drive is designed as extra-pole one, with an upper boundary point of the small-size convex construction section of the tooth face profile of one of the paired wheel located at a tooth addendum; wherein the involute sections forming recess or approach phases of meshing; and with values of said discrete face intermating angles taken from the following ratio: $\phi_{D1,2}/\tau_{1,2} \leq 0.4$.

4. The gear drive according to claim 1 comprising a pair of base tooth contours wherein said face tooth profiles including arc-shaped sections, made concave at the tooth addendum and convex at the tooth dedendum, and circumscribed by mixed curves, with inflection at said theoretical points of contact of the extra-pole sections;
characterized in that said drive is designed as extra-pole one, with said arc-shaped dedendum and addendum sections continuously interconnected at an intermediate inflection point at the tooth reference dedendum with a profile angle $\alpha_c$; and with values of said discrete face intermating angles taken from the following ratio: $\phi_{D1,2}/\tau_{1,2} \leq 0.25$.

5. The gear drive according to claim 1, characterized in that said drive is designed with deviations of geometrical parameters that are equivalent to an increased distance between axles of cylindrical wheels or axial setting of bevel wheels, and said extra-pole arc-shaped sections of the tooth face profiles at pressure angles exceeding a theoretical pressure angle $\alpha_k$, are circumscribed by smooth curves, which are proximate to circular arcs with essentially identical values of curvature radii.

* * * * *